3,476,409
PIPE UNION
Erich Benteler, Heepen, and Wilhelm Schmidt and Willi
Schmidt, Bielefeld, Germany, assignors to Benteler-
Werke Aktiengesellschaft, Bielefeld, Germany
Filed June 13, 1968, Ser. No. 736,701
Claims priority, application Germany, June 14, 1967,
B 71,397; Jan. 8, 1968, B 74,107; Feb. 17, 1968,
B 96,712
Int. Cl. F16l 55/00, 35/00
U.S. Cl. 285—40                              15 Claims

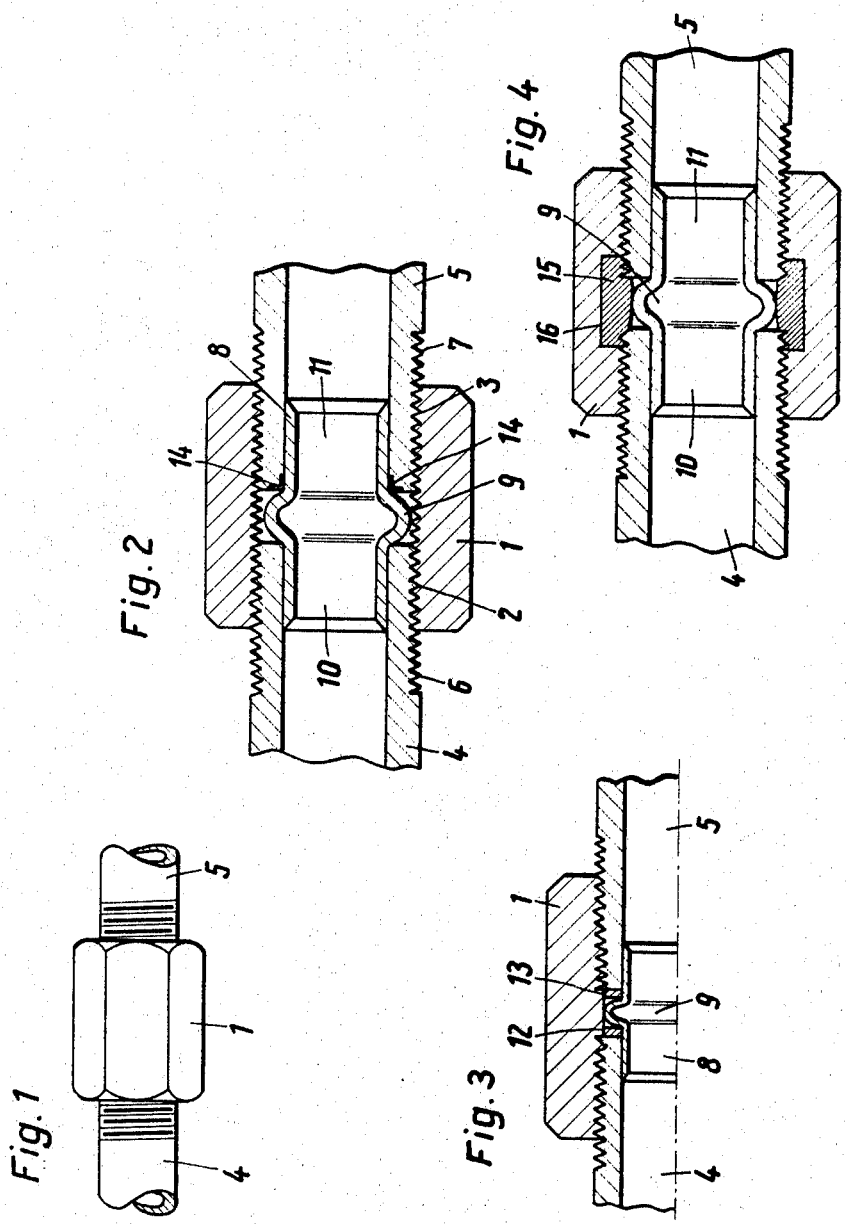

ABSTRACT OF THE DISCLOSURE

A pipe union includes a first and a second tubular member which are arranged in end-to-end relationship, and a tubular coupling member surrounding the adjacent end portions of the tubular members threadedly connected thereto. An annular sealing means of deformable material is received within the tubular coupling member and is adapted for providing a fluid-tight seal between the same and the first and second tubular members, respectively.

Background of the invention

The present invention relates generally to a pipe union, and more particularly to a pipe union suitable for connecting heating pipes, water pipes, or the like, and employing a coupling member.

It is known to connect tubular members such as pipes which are arranged in end-to-end relationship by means of a tubular coupling member or muff which is threaded onto the adjacent end portions of the tubular members to be connected. In such construction, a seal to prevent the escape of fluid is provided by winding oakum or hemp onto the threads of the tubes before the coupling member is threadedly connected with the same. In place of oakum or hemp, other substances well known to those skilled in the art can also be utilized, and sometimes such substances are used in addition to hemp or oakum.

Pipe unions which are sealed in this manner suffer from a distinct disadvantage, namely, the fact that they have a tendency to leak when subjected to temperature fluctuations because of the existing differences in the coefficients of thermal expansion of the various materials involved. It has therefore long been considered desirable to provide a pipe union which is not subject to these disadvantages. Heretofore, however, no construction became known which is capable of meeting these requirements.

It is therefore an object of the present invention to provide a pipe union which overcomes the above-mentioned disadvantages.

More particularly, it is an object of the invention to provide such a pipe union which is not only very simple in its construction, and therefore economical, but which is capable of remaining fluid-tight even when subjected to large temperature fluctuations.

Summary of the invention

Pursuant to the above objects, and to others which will become apparent hereinafter, one feature of our invention resides in the provision of a pipe union which comprises a first and a second tubular member arranged in end-to-end relationship. A tubular coupling member surrounds the adjacent end portions of the first and second tubular members and is threadedly connected thereto. An annular sealing means consisting of deformable material is received within the tubular coupling member and adapted for providing a fluid-tight seal between the same and the first and second tubular members, respectively, in response to relative axial movement between the tubular coupling member and at least one of the first and second tubular members in a sense resulting in deeper penetration of the respective tubular member into the coupling member.

One embodiment of our invention contemplates the use of an annular sealing means in the form of a sleeve member the respective end portions of which extend into the corresponding end portions of the first and second tubular members which are to be connected, and which has between its end portions a radially outwardly bulging annular intermediate portion whose outer diameter is greater than the inner diameter of the tubular members. With this sleeve member being so inserted into the respective end portions of the tubular members to be connected, and with the same being in turn surrounded by the coupling member, axial movement between the coupling member and the tubular members in a sense effecting deeper penetration of the latter into the coupling member will axially compress the intermediate portion of the sleeve member. This, in turn, will result a radial expansion of the annular intermediate portion into engagement with the inner face of the tubular coupling member. The axial end faces of the respective tubular members abut against the thus deformed annular intermediate portion from opposite axial sides, and a reliable seal is thus provided.

Advantageously, the material of the sealing means, that is in the aforementioned embodiment of the sleeve member, and that of the coupling member will have identical, or substantially identical, coefficients of thermal expansion and contraction. Evidently, the thermal expansion or contraction which takes place in both of these members when the pipe union is subjected to temperature fluctuations will be identical or nearly identical and the integrity of the seal will thus be guaranteed.

In view of the fact that the annular sealing means consists of deformable material, it is advantageous to provide a pair of protective ring members overlying the respective axial end faces of the tubular members and preferably consisting of a relatively soft material, for example synthetic plastic or a soft metal, which serve to protect the sealing means, for instance the annular intermediate portion of the sleeve member, from damage by sharp edges on the tubular members. Of course, the sleeve member may be hardened once the seal is established, if this is desired for any reason.

In accordance with a further feature of the invention, we may supplement the sleeve member by providing in a smooth portion of the inner circumferential face of the coupling member, located between the inwardly extending interior threads which mesh with the exterior threads on the tubular members to be connected, a radial circumferential recess. The recess is so positioned that it registers with the annular intermediate portion of the sealing member when the pipe union is assembled. Arranged in this recess is a ring of sealing material, for instance synthetic plastic material, and this is engaged in sealing relationship by the annular intermediate portion when the same undergoes radial expansion in response to deeper penetration of the respective tubular members into the coupling member. Evidently the ring may also be utilized without the sleeve member if it is so configurated that the exterior threads on the tubular members will cut corresponding counterthreads into the ring when the tubular members are caused to penetrate deeper into the coupling member.

Further, an embodiment of the invention contemplates an annular sealing means which does not make use of the aforementioned sleeve member, but rather provides in the threaded interior circumferential surface of the coupling member two axially spaced radial circumferential recesses, with a sealing ring corresponding to the one just described being received in each of these recesses and being so configured that the exterior threads of the respective tubular members will cut corresponding counterthreads into the respective sealing ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawings

FIG. 1 is a side elevation of a pipe union according to one embodiment of the invention;

FIG. 2 is an elevational view showing an axial section through the pipe union of FIG. 1 with the components partially assembled;

FIG. 3 is a view substantially similar to FIG. 2 but illustrating a somewhat different embodiment with the components assembled in fluid-tight relationship;

FIG. 4 is a view similar to FIG. 2 but illustrating a further embodiment of the invention;

Description of the preferred embodiments

Figure 5:
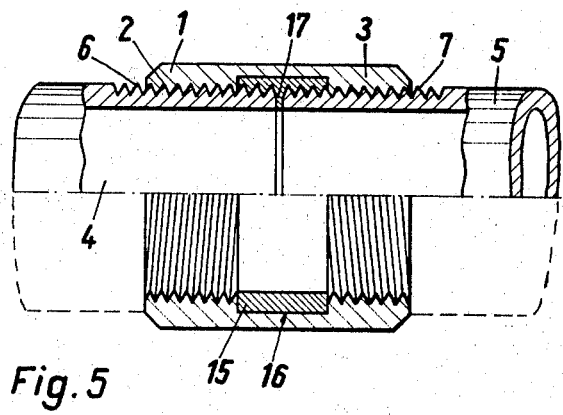
FIG. 5 is a view similar to FIG. 4 but of an additional embodiment of the invention.

Discussing now the drawings in detail, and firstly FIG. 1 thereof, it will be seen that the pipe union comprises a first tubular member 4 and a second tubular member 5, for example heating pipes, water pipes, or the like. The members 4 and 5 are arranged in end-to-end relationship and are fluid-tightly connected by a coupling member or muff 1, which may be of hexagonal exterior outline but which may also be of any other desired geometric shape.

FIG. 2 shows in axial section one possible embodiment of the pipe union according to the present invention. In this illustration, the interior circumferential surface of the coupling member 1 is provided with two screw threads 2 and 3 which respectively extend inwardly from the opposite axial ends of the member 1. One of these screw threads is a right-hand screw thread and the other is a left-hand screw thread. The end portions of the tubular members 4 and 5 are respectively provided with exterior screw threads 6 and 7, and the provision of the right-hand and left-hand screw threads on the coupling member 1 makes it possible to effect threaded connection of the same with the tubular members 4 and 5 by rotating the coupling member 1, rather than the tubular members 4 and 5.

In the embodiment of FIG. 2, the deformable annular sealing means is provided in form of an annular sleeve member 8 whose opposite axial end portions 10 and 11 are respectively received in the open ends of the tubular members 4 and 5. Intermediate the end portions 10 and 11 the sleeve member 8 is provided with a radially outwardly bulging intermediate portion 9. It will be appreciated that compressive stresses exerted in axial direction upon the intermediate portion 9 by axial movements of the tubular members 4 and 5 in a sense inserting these deeper into the member 1, will axially compress the intermediate portion 9 so that it tightly engages the end faces of the tubular members 4 and 5. During such axial compression, the intermediate portion 9 also undergoes a radial expansion, that is it increases its diameter and is pressed into sealing relationship with the inner circumferential surface of the coupling member 1. This end position, in which the pipe union is fluid-tight, is shown in FIG. 3. Although the embodiment of FIG. 3 differs slightly from that of FIG. 2, as will be discussed below, it is identical with FIG. 2 as far as the sealing action is concerned.

To avoid the possibility of damage to the sleeve member 8, for instance by shearing of the intermediate portion 9, it is advantageous to provide annular ring-shaped inserts 14 which at least cover the radially innermost edge of the end faces on the tubular members 4 and 5. In the embodiment of FIG. 2, a tubular portion of the members 14 extends into the interior of the associated tubular member.

The embodiment of FIG. 3 is identical with that of FIG. 2 except for the replacement of the members 14 with the sealing rings 12 and 13 which cover more of the respective end faces and do not extend into the interior of the respective tubular members. The sealing rings 12 and 13, as well as the members 14, may consist of synthetic plastic material or a suitable metallic material. Both in the embodiment of FIG. 2 and in that of FIG. 3, the inner circumferential face of the sleeve member 8 is advantageously beveled at the opposite axial ends so as to reduce the resistance to flow of fluid and to avoid as much as possible the creation of eddies.

The embodiment of FIG. 4 is, again, substantially similar to those of FIGS. 2 and 3. In addition to the sleeve member 8, however, the annular sealing means of the embodiment of FIG. 4 further comprises a ring-shaped insert 15, which also consists of a deformable material. As shown in FIG. 4, the inner circumferential surface of the coupling member 1 is provided with an annular circumferential recess 16 in which the ring-shaped sealing member 15 is received. Advantageously, the depth of this recess 16 is greater than the depth of the interior threads provided in the member 1, as shown in FIG. 4, and the wall thickness of the ring 15 is such that the exterior threads of the tubular members 4 and 5 may cut into the material of the ring 15. The intermediate portion 9 will be radially expanded into tight sealing engagement with the ring 15 and the cutting of the exterior threads on the members 4 and 5 into the interior of the ring 15 will provide an auxiliary sealing action. To assure that such cutting of the threads into the material of member 15 takes place, the axial length of the recess 16 and of the member 15 will be correspondingly selected, advantageously in such a manner that several turns of each screw threads 6 and 7 will cut into the member 15. It should be noted that this cutting into the material of member 15 necessarily results in a certain axial displacement of the material of the member 15 so that the same will bulge radially inwardly, as shown in FIG. 4, whereby the sealing pressure between the member 15 and the intermediate portion 9 of the sleeve member 8 is enhanced still further. It is advantageous to select the wall thickness of the member 15 in such a manner that, when it is received in the recess 16, the inner diameter of the member 15 is smaller than the outer diameter of the threads 6 and 7 on the members 4 and 5. This assures tight engagement of these threads in the material of the member 15, which latter may, as already pointed out, consist of synthetic plastic material, and particularly of polytetrafluorethylene.

Advantageously, the cross-sectional outline of the circumferential wall of the member 15 in undeformed condition will be rectangular, corresponding to the cross-sectional outline of the recess 16, with the longer dimension of the rectangle parallelling the axis of the member 15 and thus that of the coupling member 1. The axial length of the recess 16 may, but need not, correspond to approximately one-third of the outer diameter of the member 1.

The sleeve member 8 and the coupling member 1 may consist of various materials, but it is advantageous that these materials have an identical or nearly identical coefficient of thermal expansion and contraction. Steel may be mentioned here as one suitable material.

Coming now to the embodiment of FIG. 5, it will be seen that this corresponds substantially to that of FIG. 4. However, in FIG. 5 the sleeve member 8 has been omitted. In all other respects the embodiment of FIG. 5 is the same as that of FIG. 4, it being understood that the radially inwardly bulging material of the member 15, here identified by reference numeral 17, will in this embodiment be compressed between the axial end faces of the tubular members 4 and 5.

Figure 6:
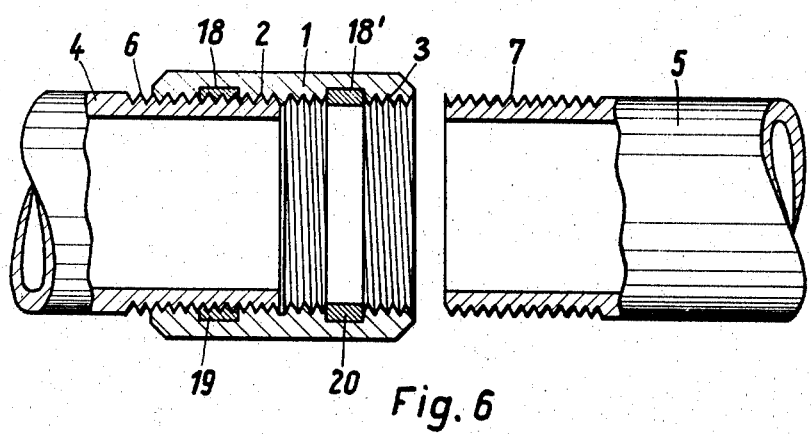
FIG. 6 is an axial section through yet another embodiment of the invention.

Coming, finally, to the embodiment of FIG. 6, it will be seen that this is reminiscent of the embodiment of FIG. 5, except that here the single recess 16 is replaced by two axially spaced recesses 18 and 18' provided on the inner circumferential surface of the coupling member 1. Each of the recesses 18, 18' is located in a portion of the inner circumferential surface of the member 1 which is either provided with the interior screw thread 2 or the interior screw thread 3. Received in each of the recesses 18, 18' is a ring member 19, 20 corresponding to the one identified by reference numeral 15 in FIGS. 4 and 5 and consisting of one of the materials set forth as suitable in connection with the description of the member 15. In this embodiment, also, the threads 6 and 7 on the tubular members 4 and 5 will cut corresponding counterthreads into the material of the respective ring members 19 and 20, thus providing a reliable sealing action. The axial length of the respective recesses 18 and 18', and accordingly of the ring members 19 and 20, is so selected that several turns of thread will be cut into each of the members 19 and 20 when the tubular members 4 and 5 are threaded into the coupling member 1. It will be appreciated that it is possible to combine the embodiment of FIG. 6 with that of FIG. 5, that is, to either provide the recesses 18, 18' with the associated ring members 19 and 20 in addition to the recess 16 and the ring member 15 of FIG. 5, which would then be located intermediate the recesses 18 and 18', or to incorporate the recss 16 and the ring member 15 of FIG. 5 in FIG. 6, again located intermediate the recesses 18 and 18' thereof. Further, it is of course possible to provide the sleeve member 8 of FIGS. 2–4 in the embodiment of FIG. 6, either with or without the recess 16 and the ring member 15 of FIG. 5.

It should still be mentioned that the members 12, 13 and 14 may consist not only of a synthetic plastic material, but instead of copper, brass, or a similar relatively soft non-ferrous material.

It will be understood that each of the elements described above, or two or more together, may also find a useful application in other types of constructions differing from the types described above.

While the invention has been illustrated and described as embodied in a pipe union, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pipe union, comprising, in combination, a first and a second tubular member arranged in end-to-end relationship, each of said members having a predetermined inner diameter and said members being slightly spaced from each other; a tubular coupling member surrounding the adjacent end portions of said first and second tubular members threadedly connected to both said first and second tubular members so as to form together with said tubular members a closed annular space between said tubular members and said coupling member; and an annular sealing sleeve member consisting of hardened steel and located in said first and second tubular members in the region of said tubular coupling member, said sleeve member having respective straight end portions of an outer diameter smaller than said predetermined inner diameter of said first and second tubular members and being received in the respective tubular members, and said sleeve member further having a radially outwardly bulging annular intermediate portion forming an internal groove and projecting into said annular space between said first and said second tubular members and having an outer diameter greater than said inner diameter of said first and second tubular members, said intermediate portion undergoing axial compression and corresponding radial expansion in response to said relative axial movement to thereby sealingly engage said tubular members and said coupling member.

2. A pipe union as defined in claim 1 wherein said tubular members have respective externally threaded end portions, and wherein said coupling member is provided with respective axially inwardly extending interior threads adapted to mesh with the threads on one of said tubular members, one of said interior threads being a left-hand thread and the other being a right-hand thread.

3. A pipe union as defined in claim 1, the material of said coupling member and the material of said sleeve member having at least substantially identical coefficients of thermal expansion and contraction.

4. A pipe union as defined in claim 1, said tubular members having respective endfaces facing towards one another; and further comprising a pair of protective rings each overlying at least an annular portion of one of said endfaces.

5. A pipe union as defined in claim 4, wherein said protective rings consist of relatively soft deformable material, and wherein said annular portion is the radially innermost annular portion of each of said endfaces.

6. A pipe union as defined in claim 5, each of said protective rings having an axially extending annular portion received in the associated tubular member engaging the inner circumferential surface thereof inwardly adjacent the respective endface.

7. A pipe union as defined in claim 1, said sleeve member having respective axial ends, and wherein said sleeve member is provided at each of said axial ends with an axially and inwardly converging bevel face.

8. A pipe union as defined in claim 1, wherein said tubular members have respective externally threaded end portions, and wherein said coupling member is provided with respective axially inwardly extending interior threads adapted to mesh with the threads on one of said tubular members, one of said interior threads being a left-hand thread and the other being a right-hand thread, said interior threads extending axially inwardly towards one another but terminating short of each other so that said coupling member is provided with a smooth annular interior face intermediate said interior threads, and wherein said intermediate portion sealingly presses against said annular interior face.

9. A pipe union as defined in claim 8; and further comprising a ring of sealing material provided on said annular interior face interposed between the same and said intermediate portion in sealing engagement with both.

10. A pipe union as defined in claim 9, wherein said sealing material is a synthetic plastic material.

11. A pipe union as defined in claim 10, wherein said synthetic plastic material is polytetrafluorethylene.

12. A pipe union as defined in claim 9, wherein said annular interior face is provided with at least one annular radial recess, said ring of sealing material being received in said recess, and wherein said recess and said ring are of such axial length and so constructed that external threads on the respective tubular members cut into said ring of sealing material in response to said relative axial movement.

13. A pipe union as defined in claim 12, said ring projecting radially inwardly out of said recess and having an inner diameter smaller than the outer diameter of the threads on said end portions of said tubular members.

14. A pipe union as defined in claim 12, said ring having a circumferential wall of substantially rectangular cross-section with the larger dimension extending in axial direction of said ring and said recess.

15. A pipe union as defined in claim 12, said recess having an axial length corresponding to substantially one-third of the outer diameter of said coupling member.

References Cited
UNITED STATES PATENTS

| | | | |
|---|---|---|---|
| 278,800 | 6/1883 | Kline | 285—175 |
| 360,172 | 3/1887 | Reese | 285—40 X |
| 581,050 | 4/1897 | Wentz | 285—175 |
| 2,287,142 | 6/1942 | Simmonds | 285—371 X |
| 3,241,867 | 3/1966 | Guarnaschelli | 285—109 |
| 3,266,821 | 8/1966 | Safford | 285—40 |
| 3,268,240 | 8/1966 | Gerner | 285—371 X |

FOREIGN PATENTS

| | | |
|---|---|---|
| 343,781 | 2/1931 | Great Britain. |
| 545,972 | 6/1922 | Great Britain. |
| 949,289 | 2/1964 | Great Britain. |

THOMAS F. CALLAGHAN, Primary Examiner

U.S. Cl. X.R.

285—175, 371